US 12,174,246 B2

(12) United States Patent
DeLaCruz et al.

(10) Patent No.: US 12,174,246 B2
(45) Date of Patent: *Dec. 24, 2024

(54) SECURITY CIRCUITRY FOR BONDED STRUCTURES

(71) Applicant: ADEIA SEMICONDUCTOR BONDING TECHNOLOGIES INC., San Jose, CA (US)

(72) Inventors: Javier A. DeLaCruz, San Jose, CA (US); Belgacem Haba, Saratoga, CA (US); Guy Regev, Valley Village, CA (US)

(73) Assignee: Adeia Semiconductor Bonding Technologies Inc., San Jose, CA (US)

( * ) Notice: Subject to any disclaimer, the term of this patent is extended or adjusted under 35 U.S.C. 154(b) by 157 days.

This patent is subject to a terminal disclaimer.

(21) Appl. No.: 17/805,817

(22) Filed: Jun. 7, 2022

(65) Prior Publication Data
US 2022/0373593 A1 Nov. 24, 2022

Related U.S. Application Data

(63) Continuation of application No. 16/881,621, filed on May 22, 2020, now Pat. No. 11,385,278.
(Continued)

(51) Int. Cl.
H01L 23/00 (2006.01)
G01R 31/28 (2006.01)
G01R 31/70 (2020.01)

(52) U.S. Cl.
CPC ......... *G01R 31/2853* (2013.01); *G01R 31/70* (2020.01); *H01L 24/10* (2013.01); *H01L 24/80* (2013.01)

(58) Field of Classification Search
CPC ..... H01L 24/10; H01L 24/80; H01L 23/5384; H01L 23/53238; G01R 31/2853; G01R 31/70
See application file for complete search history.

(56) References Cited

U.S. PATENT DOCUMENTS 5,451,547 A 9/1995 Himi et al.
5,753,536 A 5/1998 Sugiyama et al.
(Continued)

FOREIGN PATENT DOCUMENTS

CN 107946249 A 4/2018
JP 2002-353416 12/2002
(Continued)

OTHER PUBLICATIONS

Amirfeiz et al., "Formation of silicon structures by plasma-activated wafer bonding," Journal of The Electrochemical Society, 2000, vol. 147, No. 7, pp. 2693-2698.
(Continued)

*Primary Examiner* — Nathan W Ha
(74) *Attorney, Agent, or Firm* — Knobbe Martens Olson & Bear, LLP

(57) ABSTRACT

A bonded structure is disclosed. The bonded structure can include a first semiconductor element having a first front side and a first back side opposite the first front side. The bonded structure can include a second semiconductor element having a second front side and a second back side opposite the second front side, the first front side of the first semiconductor element directly bonded to the second front side of the second semiconductor element along a bond interface without an adhesive. The bonded structure can include security circuitry extending across the bond interface, the security circuitry electrically connected to the first and second semiconductor elements.

24 Claims, 5 Drawing Sheets

Related U.S. Application Data

(60) Provisional application No. 62/953,069, filed on Dec. 23, 2019, provisional application No. 62/852,175, filed on May 23, 2019.

(56) References Cited

U.S. PATENT DOCUMENTS

| | | |
|---|---|---|
| 5,771,555 A | 6/1998 | Eda et al. |
| 6,080,640 A | 6/2000 | Gardner et al. |
| 6,180,496 B1 | 1/2001 | Farrens et al. |
| 6,423,640 B1 | 7/2002 | Lee et al. |
| 6,465,892 B1 | 10/2002 | Suga |
| 6,645,828 B1 | 11/2003 | Farrens et al. |
| 6,887,769 B2 | 5/2005 | Kellar et al. |
| 6,908,027 B2 | 6/2005 | Tolchinsky et al. |
| 6,908,832 B2 | 6/2005 | Farrens et al. |
| 7,045,453 B2 | 5/2006 | Canaperi et al. |
| 7,105,980 B2 | 9/2006 | Abbott et al. |
| 7,193,423 B1 | 3/2007 | Dalton et al. |
| 7,489,013 B1 | 2/2009 | Chubin et al. |
| 7,750,488 B2 | 7/2010 | Patti et al. |
| 7,803,693 B2 | 9/2010 | Trezza |
| 8,183,127 B2 | 5/2012 | Patti et al. |
| 8,349,635 B1 | 1/2013 | Gan et al. |
| 8,377,798 B2 | 2/2013 | Peng et al. |
| 8,441,131 B2 | 5/2013 | Ryan |
| 8,476,165 B2 | 7/2013 | Trickett et al. |
| 8,482,132 B2 | 7/2013 | Yang et al. |
| 8,501,537 B2 | 8/2013 | Sadaka et al. |
| 8,524,533 B2 | 9/2013 | Tong et al. |
| 8,581,108 B1 | 11/2013 | Boone et al. |
| 8,620,164 B2 | 12/2013 | Heck et al. |
| 8,647,987 B2 | 2/2014 | Yang et al. |
| 8,697,493 B2 | 4/2014 | Sadaka |
| 8,716,105 B2 | 5/2014 | Sadaka et al. |
| 8,802,538 B1 | 8/2014 | Liu |
| 8,809,123 B2 | 8/2014 | Liu et al. |
| 8,841,002 B2 | 9/2014 | Tong |
| 9,093,350 B2 | 7/2015 | Endo et al. |
| 9,142,517 B2 | 9/2015 | Liu et al. |
| 9,171,756 B2 | 10/2015 | Enquist et al. |
| 9,184,125 B2 | 11/2015 | Enquist et al. |
| 9,196,555 B1 | 11/2015 | Lower et al. |
| 9,224,704 B2 | 12/2015 | Landru |
| 9,230,941 B2 | 1/2016 | Chen et al. |
| 9,246,311 B1 | 1/2016 | Raring et al. |
| 9,257,399 B2 | 2/2016 | Kuang et al. |
| 9,299,736 B2 | 3/2016 | Chen et al. |
| 9,312,229 B2 | 4/2016 | Chen et al. |
| 9,331,149 B2 | 5/2016 | Tong et al. |
| 9,337,235 B2 | 5/2016 | Chen et al. |
| 9,385,024 B2 | 7/2016 | Tong et al. |
| 9,394,161 B2 | 7/2016 | Cheng et al. |
| 9,431,368 B2 | 8/2016 | Enquist et al. |
| 9,437,572 B2 | 9/2016 | Chen et al. |
| 9,443,796 B2 | 9/2016 | Chou et al. |
| 9,455,233 B1 | 9/2016 | Bhooshan et al. |
| 9,461,007 B2 | 10/2016 | Chun et al. |
| 9,496,239 B1 | 11/2016 | Edelstein et al. |
| 9,536,848 B2 | 1/2017 | England et al. |
| 9,559,081 B1 | 1/2017 | Lai et al. |
| 9,620,481 B2 | 4/2017 | Edelstein et al. |
| 9,656,852 B2 | 5/2017 | Cheng et al. |
| 9,723,716 B2 | 8/2017 | Meinhold |
| 9,728,521 B2 | 8/2017 | Tsai et al. |
| 9,741,620 B2 | 8/2017 | Uzoh et al. |
| 9,799,587 B2 | 10/2017 | Fujii et al. |
| 9,852,988 B2 | 12/2017 | Enquist et al. |
| 9,893,004 B2 | 2/2018 | Yazdani |
| 9,899,442 B2 | 2/2018 | Katkar |
| 9,929,050 B2 | 3/2018 | Lin |
| 9,941,241 B2 | 4/2018 | Edelstein et al. |
| 9,941,243 B2 | 4/2018 | Kim et al. |
| 9,953,941 B2 | 4/2018 | Enquist |
| 9,960,142 B2 | 5/2018 | Chen et al. |
| 10,002,844 B1 | 6/2018 | Wang et al. |
| 10,014,429 B2 | 7/2018 | Newman et al. |
| 10,026,605 B2 | 7/2018 | Doub et al. |
| 10,026,716 B2 | 7/2018 | Yu et al. |
| 10,075,657 B2 | 9/2018 | Fahim et al. |
| 10,204,893 B2 | 2/2019 | Uzoh et al. |
| 10,269,708 B2 | 4/2019 | Enquist et al. |
| 10,269,756 B2 | 4/2019 | Uzoh |
| 10,276,619 B2 | 4/2019 | Kao et al. |
| 10,276,909 B2 | 4/2019 | Huang et al. |
| 10,418,277 B2 | 9/2019 | Cheng et al. |
| 10,437,012 B1 | 10/2019 | Gurin |
| 10,446,456 B2 | 10/2019 | Shen et al. |
| 10,446,487 B2 | 10/2019 | Huang et al. |
| 10,446,532 B2 | 10/2019 | Uzoh et al. |
| 10,522,499 B2 | 12/2019 | Enquist et al. |
| 10,707,087 B2 | 7/2020 | Uzoh et al. |
| 10,727,219 B2 | 7/2020 | Uzoh et al. |
| 10,784,191 B2 | 9/2020 | Huang et al. |
| 10,790,262 B2 | 9/2020 | Uzoh et al. |
| 10,840,135 B2 | 11/2020 | Uzoh |
| 10,840,205 B2 | 11/2020 | Fountain, Jr. et al. |
| 10,854,578 B2 | 12/2020 | Morein |
| 10,879,212 B2 | 12/2020 | Uzoh et al. |
| 10,886,177 B2 | 1/2021 | DeLaCruz et al. |
| 10,886,255 B2 | 1/2021 | Hong et al. |
| 10,892,246 B2 | 1/2021 | Uzoh |
| 10,923,408 B2 | 2/2021 | Huang et al. |
| 10,923,413 B2 | 2/2021 | DeLaCruz |
| 10,950,547 B2 | 3/2021 | Mohammed et al. |
| 10,964,664 B2 | 3/2021 | Mandalapu et al. |
| 10,985,133 B2 | 4/2021 | Uzoh |
| 10,991,804 B2 | 4/2021 | DeLaCruz et al. |
| 10,998,292 B2 | 5/2021 | Lee et al. |
| 11,004,757 B2 | 5/2021 | Katkar et al. |
| 11,011,494 B2 | 5/2021 | Gao et al. |
| 11,011,503 B2 | 5/2021 | Wang et al. |
| 11,031,285 B2 | 6/2021 | Katkar et al. |
| 11,056,348 B2 | 7/2021 | Theil |
| 11,088,099 B2 | 8/2021 | Katkar et al. |
| 11,127,738 B2 | 9/2021 | DeLaCruz et al. |
| 11,158,573 B2 | 10/2021 | Uzoh et al. |
| 11,158,606 B2 | 10/2021 | Gao et al. |
| 11,169,326 B2 | 11/2021 | Huang et al. |
| 11,171,117 B2 | 11/2021 | Gao et al. |
| 11,176,450 B2 | 11/2021 | Teig et al. |
| 11,195,748 B2 | 12/2021 | Uzoh et al. |
| 11,205,625 B2 | 12/2021 | DeLaCruz et al. |
| 11,244,920 B2 | 2/2022 | Uzoh |
| 11,256,004 B2 | 2/2022 | Haba et al. |
| 11,264,357 B1 | 3/2022 | DeLaCruz et al. |
| 11,276,676 B2 | 3/2022 | Enquist et al. |
| 11,296,044 B2 | 4/2022 | Gao et al. |
| 11,329,034 B2 | 5/2022 | Tao et al. |
| 11,348,898 B2 | 5/2022 | DeLaCruz et al. |
| 11,355,443 B2 | 6/2022 | Huang et al. |
| 11,367,652 B2 | 6/2022 | Uzoh et al. |
| 11,373,963 B2 | 6/2022 | DeLaCruz et al. |
| 11,380,597 B2 | 7/2022 | Katkar et al. |
| 11,385,278 B2 * | 7/2022 | DeLaCruz ............ H01L 23/573 |
| 11,387,196 B2 | 7/2022 | Kang et al. |
| 11,610,846 B2 | 3/2023 | Haba et al. |
| 11,728,287 B2 | 8/2023 | DeLaCruz et al. |
| 11,848,284 B2 | 12/2023 | DeLaCruz et al. |
| 2002/0003307 A1 | 1/2002 | Suga |
| 2004/0084414 A1 | 5/2004 | Sakai et al. |
| 2004/0188819 A1 | 9/2004 | Farnworth et al. |
| 2006/0057945 A1 | 3/2006 | Hsu et al. |
| 2007/0030022 A1 | 2/2007 | Kash et al. |
| 2007/0111386 A1 | 5/2007 | Kim et al. |
| 2008/0006938 A1 | 1/2008 | Patti et al. |
| 2008/0088996 A1 | 4/2008 | Bonvalot et al. |
| 2008/0251906 A1 | 10/2008 | Eaton et al. |
| 2009/0072343 A1 | 3/2009 | Ohnuma et al. |
| 2009/0246355 A9 | 10/2009 | Lower et al. |
| 2010/0032776 A1 | 2/2010 | Pham et al. |
| 2010/0171202 A1 | 7/2010 | Tian et al. |
| 2010/0190334 A1 | 7/2010 | Lee |
| 2010/0216294 A1 | 8/2010 | Rabarot et al. |

(56) References Cited

U.S. PATENT DOCUMENTS

| | | |
|---|---|---|
| 2010/0314149 A1 | 12/2010 | Gerrish et al. |
| 2010/0315108 A1 | 12/2010 | Fornara et al. |
| 2011/0090658 A1 | 4/2011 | Adams et al. |
| 2012/0256305 A1 | 10/2012 | Kaufmann et al. |
| 2012/0313176 A1 | 12/2012 | Frohberg et al. |
| 2013/0328174 A1 | 12/2013 | La Tulipe, Jr et al. |
| 2014/0035136 A1 | 2/2014 | Buer et al. |
| 2014/0175655 A1 | 6/2014 | Chen et al. |
| 2015/0064498 A1 | 3/2015 | Tong |
| 2015/0262976 A1 | 9/2015 | Edelstein et al. |
| 2016/0315055 A1 | 10/2016 | Vogt et al. |
| 2016/0343682 A1 | 11/2016 | Kawasaki |
| 2016/0377689 A1 | 12/2016 | Babulano et al. |
| 2017/0190572 A1 | 7/2017 | Pan et al. |
| 2017/0200756 A1 | 7/2017 | Kao et al. |
| 2017/0373024 A1 | 12/2017 | Graf et al. |
| 2018/0061781 A1 | 3/2018 | Petitdidier et al. |
| 2018/0175012 A1 | 6/2018 | Wu et al. |
| 2018/0182639 A1 | 6/2018 | Uzoh et al. |
| 2018/0182666 A1 | 6/2018 | Uzoh et al. |
| 2018/0190580 A1 | 7/2018 | Haba et al. |
| 2018/0190583 A1 | 7/2018 | DeLaCruz et al. |
| 2018/0219038 A1 | 8/2018 | Gambino et al. |
| 2018/0226375 A1 | 8/2018 | Enquist et al. |
| 2018/0273377 A1 | 9/2018 | Katkar et al. |
| 2018/0308808 A1 | 10/2018 | Kirschner et al. |
| 2018/0323177 A1 | 11/2018 | Yu et al. |
| 2018/0323227 A1 | 11/2018 | Zhang et al. |
| 2018/0331066 A1 | 11/2018 | Uzoh et al. |
| 2019/0096842 A1 | 3/2019 | Fountain, Jr. et al. |
| 2019/0115277 A1 | 4/2019 | Yu et al. |
| 2019/0131277 A1 | 5/2019 | Yang et al. |
| 2019/0198407 A1 | 6/2019 | Huang et al. |
| 2019/0333550 A1 | 10/2019 | Fisch |
| 2019/0385935 A1 | 12/2019 | Gao et al. |
| 2019/0385966 A1 | 12/2019 | Gao et al. |
| 2020/0013637 A1 | 1/2020 | Haba |
| 2020/0013765 A1 | 1/2020 | Fountain, Jr. et al. |
| 2020/0035641 A1 | 1/2020 | Fountain, Jr. et al. |
| 2020/0075553 A1 | 3/2020 | DeLaCruz et al. |
| 2020/0118973 A1 | 4/2020 | Wang et al. |
| 2020/0135698 A1 | 4/2020 | Hong et al. |
| 2020/0227367 A1 | 7/2020 | Haba et al. |
| 2020/0235059 A1 | 7/2020 | Cok et al. |
| 2020/0249324 A1 | 8/2020 | Steinberg et al. |
| 2020/0279821 A1 | 9/2020 | Haba et al. |
| 2020/0294908 A1 | 9/2020 | Haba et al. |
| 2020/0328162 A1 | 10/2020 | Haba et al. |
| 2020/0328163 A1 | 10/2020 | Best et al. |
| 2020/0328164 A1 | 10/2020 | DeLaCruz et al. |
| 2020/0328165 A1 | 10/2020 | DeLaCruz et al. |
| 2020/0335408 A1 | 10/2020 | Gao et al. |
| 2020/0335450 A1 | 10/2020 | Wang et al. |
| 2020/0395321 A1 | 12/2020 | Katkar et al. |
| 2020/0411483 A1 | 12/2020 | Uzoh et al. |
| 2021/0098412 A1 | 4/2021 | Haba et al. |
| 2021/0118864 A1 | 4/2021 | DeLaCruz et al. |
| 2021/0143125 A1 | 5/2021 | DeLaCruz et al. |
| 2021/0181510 A1 | 6/2021 | Katkar et al. |
| 2021/0193603 A1 | 6/2021 | Katkar et al. |
| 2021/0193624 A1 | 6/2021 | DeLaCruz et al. |
| 2021/0193625 A1 | 6/2021 | DeLaCruz et al. |
| 2021/0210439 A1 | 7/2021 | Lim et al. |
| 2021/0242152 A1 | 8/2021 | Fountain, Jr. et al. |
| 2021/0296282 A1 | 9/2021 | Gao et al. |
| 2021/0305202 A1 | 9/2021 | Uzoh et al. |
| 2021/0366820 A1 | 11/2021 | Uzoh |
| 2021/0407941 A1 | 12/2021 | Haba |
| 2022/0077063 A1 | 3/2022 | Haba |
| 2022/0077087 A1 | 3/2022 | Haba |
| 2022/0115329 A1 | 4/2022 | Kantarovsky et al. |
| 2022/0134511 A1 | 5/2022 | Ankersen |
| 2022/0139849 A1 | 5/2022 | DeLaCruz et al. |
| 2022/0139867 A1 | 5/2022 | Uzoh |
| 2022/0139869 A1 | 5/2022 | Gao et al. |
| 2022/0208650 A1 | 6/2022 | Gao et al. |
| 2022/0208702 A1 | 6/2022 | Uzoh |
| 2022/0208723 A1 | 6/2022 | Katkar et al. |
| 2022/0246497 A1 | 8/2022 | Fountain, Jr. et al. |
| 2022/0285303 A1 | 9/2022 | Mirkarimi et al. |
| 2022/0319901 A1 | 10/2022 | Suwito et al. |
| 2022/0320035 A1 | 10/2022 | Uzoh et al. |
| 2022/0320036 A1 | 10/2022 | Gao et al. |
| 2023/0005850 A1 | 1/2023 | Fountain, Jr. |
| 2023/0019869 A1 | 1/2023 | Mirkarimi et al. |
| 2023/0036441 A1 | 2/2023 | Haba et al. |
| 2023/0067677 A1 | 3/2023 | Lee et al. |
| 2023/0069183 A1 | 3/2023 | Haba |
| 2023/0100032 A1 | 3/2023 | Haba et al. |
| 2023/0115122 A1 | 4/2023 | Uzoh et al. |
| 2023/0122531 A1 | 4/2023 | Uzoh |
| 2023/0123423 A1 | 4/2023 | Gao et al. |
| 2023/0125395 A1 | 4/2023 | Gao et al. |
| 2023/0130259 A1 | 4/2023 | Haba et al. |
| 2023/0132632 A1 | 5/2023 | Katkar et al. |
| 2023/0140107 A1 | 5/2023 | Uzoh et al. |
| 2023/0142680 A1 | 5/2023 | Guevara et al. |
| 2023/0154816 A1 | 5/2023 | Haba et al. |
| 2023/0154828 A1 | 5/2023 | Haba et al. |
| 2023/0187264 A1 | 6/2023 | Uzoh et al. |
| 2023/0187317 A1 | 6/2023 | Uzoh |
| 2023/0187412 A1 | 6/2023 | Gao et al. |
| 2023/0197453 A1 | 6/2023 | Fountain, Jr. et al. |
| 2023/0197496 A1 | 6/2023 | Theil |
| 2023/0197559 A1 | 6/2023 | Haba et al. |
| 2023/0197560 A1 | 6/2023 | Katkar et al. |
| 2023/0197655 A1 | 6/2023 | Theil et al. |
| 2023/0207402 A1 | 6/2023 | Fountain, Jr. et al. |
| 2023/0207437 A1 | 6/2023 | Haba |
| 2023/0207474 A1 | 6/2023 | Uzoh et al. |
| 2023/0207514 A1 | 6/2023 | Gao et al. |
| 2023/0215836 A1 | 7/2023 | Haba et al. |
| 2023/0245950 A1 | 8/2023 | Haba et al. |
| 2023/0268300 A1 | 8/2023 | Uzoh et al. |
| 2023/0299029 A1 | 9/2023 | Theil et al. |
| 2023/0317628 A1 | 10/2023 | Haba et al. |
| 2023/0343734 A1 | 10/2023 | Uzoh et al. |
| 2023/0360950 A1 | 11/2023 | Gao |
| 2023/0361074 A1 | 11/2023 | Uzoh et al. |
| 2023/0369136 A1 | 11/2023 | Uzoh et al. |
| 2023/0375613 A1 | 11/2023 | Haba et al. |
| 2024/0055407 A1 | 2/2024 | Workman |
| 2024/0079351 A1 | 3/2024 | DeLaCruz et al. |
| 2024/0079376 A1 | 3/2024 | Suwito et al. |
| 2024/0096823 A1 | 3/2024 | DeLaCruz et al. |
| 2024/0105674 A1 | 3/2024 | Uzoh et al. |
| 2024/0170411 A1 | 5/2024 | Chang et al. |
| 2024/0186248 A1 | 6/2024 | Haba et al. |
| 2024/0186268 A1 | 6/2024 | Uzoh et al. |
| 2024/0186269 A1 | 6/2024 | Haba |
| 2024/0203917 A1 | 6/2024 | Katkar et al. |
| 2024/0213191 A1 | 6/2024 | Theil et al. |
| 2024/0213210 A1 | 6/2024 | Haba et al. |
| 2024/0217210 A1 | 7/2024 | Zhao et al. |
| 2024/0222315 A1 | 7/2024 | Uzoh |

FOREIGN PATENT DOCUMENTS

| | | |
|---|---|---|
| JP | 2010-272622 A | 12/2010 |
| JP | 2013-033786 A | 2/2013 |
| JP | 2018-160519 | 10/2018 |
| WO | WO 2005/043584 A2 | 5/2005 |
| WO | WO 2006/013507 A1 | 2/2006 |
| WO | WO 2020/034063 A1 | 2/2020 |

OTHER PUBLICATIONS

Bengtsson et al., "Low temperature bonding," International Conference on Compliant & Alternative Substrate Technology, Sep. 1999, p. 10.

Daneman, "Applying the CMOS Test Flow to MEMS Manufacturing", InvenSense, Inc., accessed on Apr. 5, 2020.

(56) References Cited

OTHER PUBLICATIONS

Farrens et al., "Chemical free room temperature wafer to wafer direct bonding," J. Electrochem. Soc., The Electrochemical Society, Inc., Nov. 1995, vol. 142, No. 11. pp. 3949-3955.

Gan, Qing, "Surface activation enhanced low temperature silicon wafer bonding," Dissertation submitted in partial fulfillment of the requirements for the degree of Doctor of Philosophy, Department of Mechanical Engineering and Materials Science, Duke University, Aug. 4, 2000, 192 pages.

Gösele et al., "Semiconductor Wafer Bonding: A flexible approach to materials combinations in microelectronics; micromechanics and optoelectronics," IEEE, 1997, pp. 23-32.

International Search Report and Written Opinion mailed Jul. 29, 2020, in International Application No. PCT/US2020/027772, 8 pages.

Ker, Ming-Dou et al., "Fully process-compatible layout design on bond pad to improve wire bond reliability in CMOS Ics," IEEE Transactions on Components and Packaging Technologies, Jun. 2002, vol. 25, No. 2, pp. 309-316.

Knechtel, J. et al., "3D integration: Another dimension toward hardware security," 2019 IEEE 25th International Symposium on On-Line Testing and Robust System Design, Jul. 2019, 5 pages.

Lohrke, H. et al., "No place to hide: Contactless probing of secret data on FPGAs," International Association for Cryptologic Research 2016, Gierlichs B., Poschmann A. (eds) Cryptographic Hardware and Embedded Systems—CHES 2016, pp. 147-167.

Moriceau, H. et al., "Overview of recent direct wafer bonding advances and applications," Advances in Natural Sciences-Nanoscience and Nanotechnology, 2010, 11 pages.

Nakanishi, H. et al., "Studies on SiO2—SiO2 bonding with hydrofluoric acid. Room temperature and low stress bonding technique for MEMS," Sensors and Actuators, 2000, vol. 79, pp. 237-244.

Oberhammer, J. et al., "Sealing of adhesive bonded devices on wafer level," Sensors and Actuators A, 2004, vol. 110, No. 1-3, pp. 407-412, see pp. 407-412, and Figures 1(a)-1(l), 6 pages.

Plobi, A. et al., "Wafer direct bonding: tailoring adhesion between brittle materials," Materials Science and Engineering Review Journal, 1999, R25, 88 pages.

Reiche et al., "The effect of a plasma pretreatment on the Si/Si bonding behaviouir," Electrochemical Society Proceedings, 1998, vol. 97-36, pp. 437-444.

Suga et al., "Bump-less interconnect for next generation system packaging," Electronic Components and Technology Conference, 2001, IEEE, pp. 1003-1008.

Suga, T., "Feasibility of surface activated bonding for ultra-fine pitch interconnection—A new concept of bump-less direct bonding for system level packaging," The University of Tokyo, Research Center for Science and Technology, 2000 Electronic Components and Technology Conference, 2000 IEEE, pp. 702-705.

Wang et al., Probing attacks on integrated circuits: Challenges and research opportunities, IEEE Design & Test, Sep./Oct. 2017, vol. 34, No. 5, pp. 63-71.

Bush, Steve, "Electronica: Automotive power modules from On Semi," ElectronicsWeekly.com, indicating an ONSEMI AR0820 product was to be demonstrated at a Nov. 2018 trade show, https://www.electronicsweekly.com/news/products/power-supplies/electronica-automotive-power-modules-semi-2018-11/ (published Nov. 8, 2018; downloaded Jul. 26, 2023).

Morrison, Jim et al., "Samsung Galaxy S7 Edge Teardown," Tech Insights (posted Apr. 24, 2016), includes description of hybrid bonded Sony IMX260 dual-pixel sensor, https://www.techinsights.com/blog/samsung-galaxy-s7-edge-teardown, downloaded Jul. 11, 2023, 9 pages.

ONSEMI AR0820 image, cross section of a CMOS image sensor product. The part in the image was shipped on Sep. 16, 2021. Applicant makes no representation that the part in the image is identical to the part identified in the separately submitted reference BUSH, Nov. 8, 2018, ElectronicsWeekly.com ("BUSH article"); however, the imaged part and the part shown in the BUSH article share the part number "ONSEMI AR0820."

Sony IMX260 images, showing various cross sections and materials analyses for a hybrid bonded back side illuminated CMOS image sensor. The part in the images was shipped in Apr. 2016. Applicant makes no representation that the part in the images is identical to the part identified in the separately submitted reference Morrison et al. (Tech Insights article dated Apr. 24, 2016), describing and showing a similar sensor product within the Samsung Galaxy S7; however the imaged part and the part shown in the Morrison et al. article share the part name "Sony IMX260 image." (8 pages).

\* cited by examiner

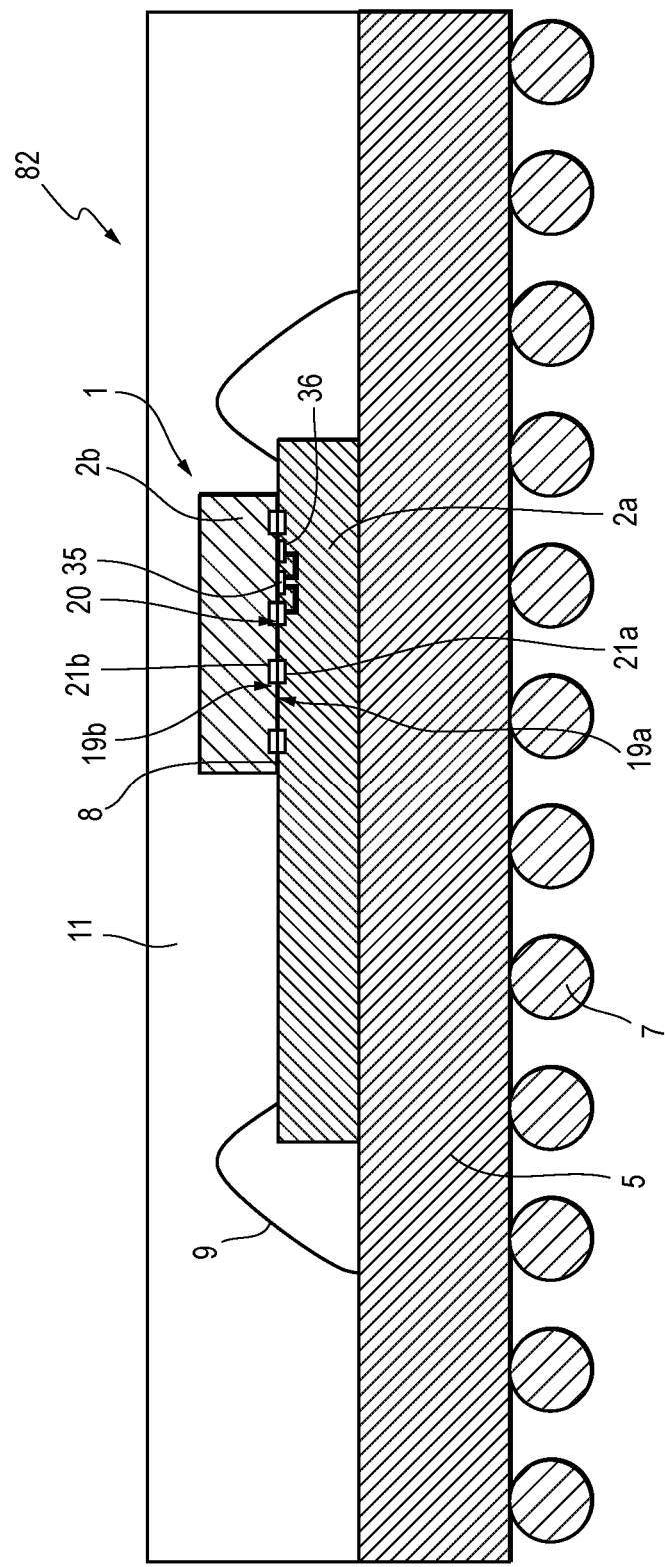

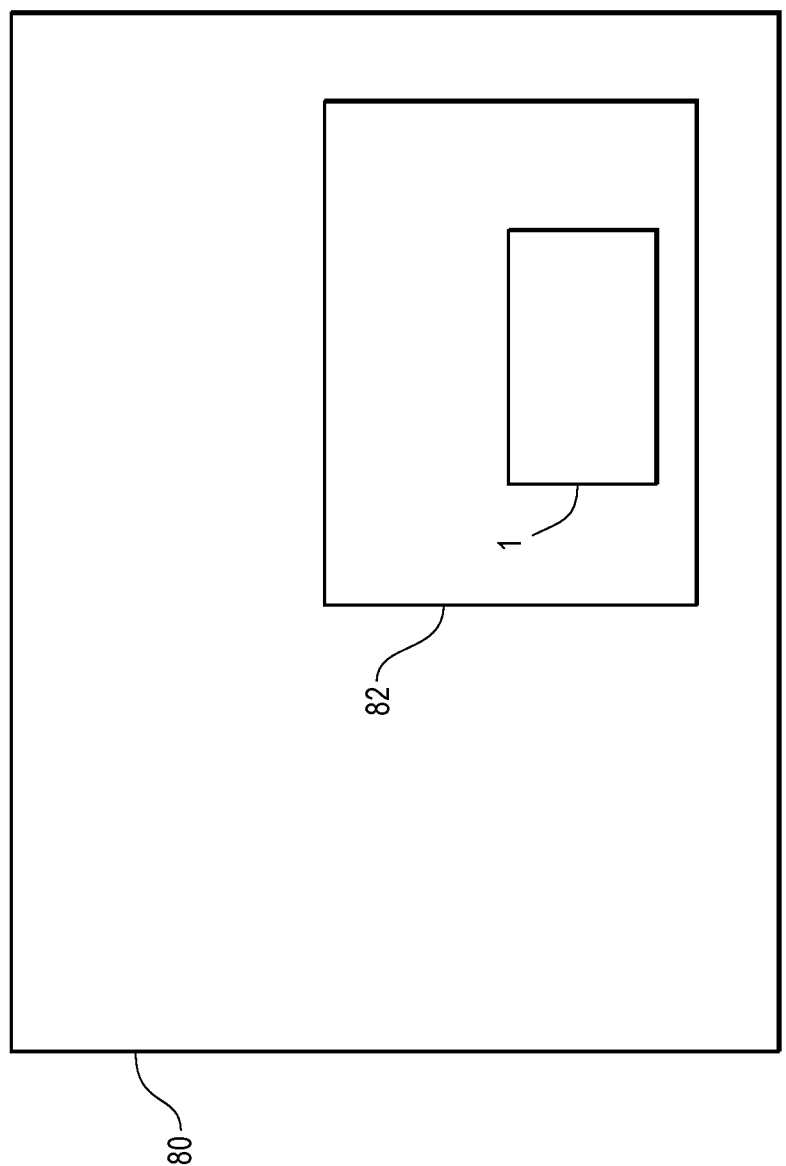

SECURITY CIRCUITRY FOR BONDED STRUCTURES

CROSS-REFERENCE TO RELATED APPLICATIONS

This application is a continuation of U.S. patent application Ser. No. 16/881,621, filed May 22, 2020, which claims priority to U.S. Provisional Patent Application No. 62/852,175, filed May 23, 2019; and to U.S. Provisional Patent Application No. 62/953,069, filed Dec. 23, 2019, the entire contents of each of which are hereby incorporated by reference in their entirety and for all purposes.

BACKGROUND

Field

The field relates to security circuitry for bonded structures.

Description of the Related Art

Semiconductor chips (e.g., integrated device dies) may include active circuitry containing security-sensitive components which contain valuable and/or proprietary information, structures or devices. For example, such security-sensitive components may include an entity's intellectual property, software or hardware security (e.g., encryption) features, privacy data, or any other components or data that the entity may wish to remain secure and hidden from third parties. For example, third party bad actors may utilize various techniques to attempt to access security-sensitive components for economic and/or geopolitical advantage. Accordingly, there remains a continuing need for improving the security of semiconductor chips from being accessed by third parties.

BRIEF DESCRIPTION OF THE DRAWINGS

FIG. 2A is a schematic side sectional view of an integrated device package that includes a bonded structure according to various embodiments.

FIG. 3 is a schematic diagram of an electronic system incorporating one or more bonded structures, according to various embodiments.

DETAILED DESCRIPTION

Figure 1B:
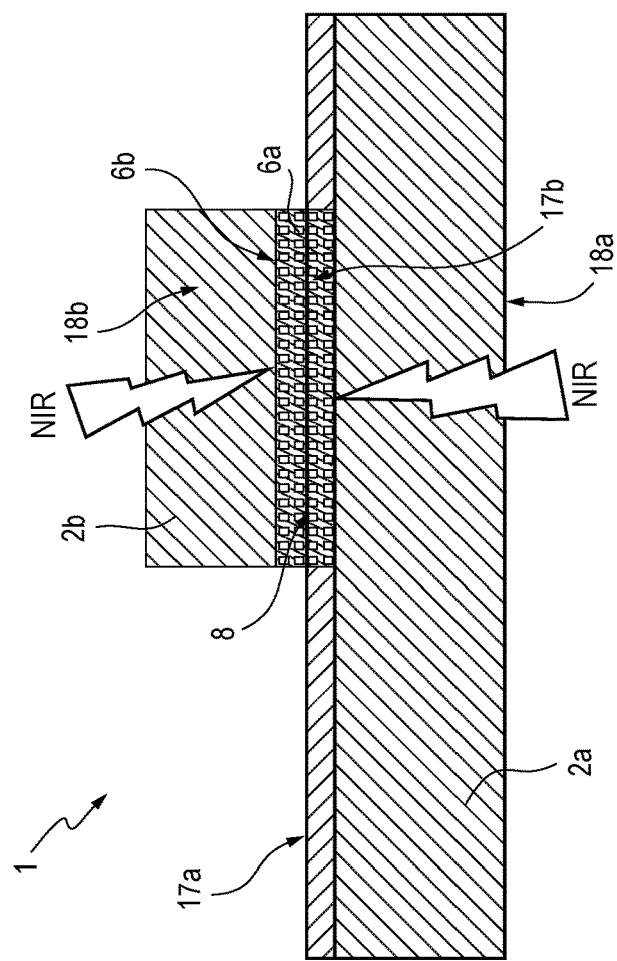
FIG. 1B is a schematic side sectional view of a bonded structure in which a second semiconductor element having active circuitry is stacked on a first semiconductor element having active circuitry.

As explained herein, third parties (such as third party bad actors) may attempt to access security-sensitive components on elements such as integrated device dies. In some elements, the security-sensitive components may be protected by a combination of netlist and non-volatile memory (NVM) data. However, third parties may attempt to hack the security-sensitive components by a combination of destructive and non-destructive techniques, e.g., probing and/or delayering the element to expose or otherwise gain access to the security-sensitive components. In some cases, the third party may attempt to hack the security-sensitive components by pulsing electromagnetic (EM) waves onto active circuitry of the element, using fault injection techniques, employing near infrared (NIR) laser triggering or focused ion beam (FIB) modification of circuits, chemical etching techniques, and other physical, chemical, and/or electromagnetic hacking tools and even reverse engineering. These techniques can be used to physically access sensitive circuits of microdevices such as integrated circuits to directly read encrypted information to trigger circuits externally to release information otherwise encrypted understand manufacturing processes, or even extract enough information to be able to eventually replicate sensitive designs. For example, in some cases hackers may attempt to access the encryption key, which can be stored in the circuit design, in memory, or in a combination of both. Techniques can also be used to indirectly read sensitive information by analyzing the resultant output based upon fault injection inputs, and through recursive analysis determine the encryption key or data contents. It is challenging to structurally protect the security-sensitive components on elements.

Accordingly, it is important to provide improved security for elements (such as semiconductor integrated device dies) that include security-sensitive components.

Various embodiments disclosed herein relate to a bonded structure 1 including a first semiconductor element 2a having a first front side 17a and a first back side 18a opposite the first front side 17a. The bonded structure 1 can include a second semiconductor element 2b having a second front side 17b and a second back side 18b opposite the second front side 17b. The first front side 17a of the first semiconductor element 2a can be directly bonded to the second front side 17b of the second semiconductor element 2b along a bond interface 8 without an adhesive. Security circuitry 20 can extend across the bond interface 8, with the security circuitry 20 electrically connected to the first and second semiconductor elements 2a, 2b. The first and second semiconductor elements 2a, 2b can include nonconductive dielectric field regions and conductive contact pads in the field regions. The dielectric field regions can be directly bonded (e.g., using dielectric-to-dielectric bonding techniques, such as the ZiBond® techniques used by Xperi Corporation of San Jose, California) to one another without an adhesive. For example, dielectric-to-dielectric bonds may be formed without an adhesive using the direct bonding techniques disclosed at least in U.S. Pat. Nos. 9,391,143 and 10,434,749, the entire contents of each of which are incorporated by reference herein in their entirety and for all purposes.

In various embodiments, the direct bonds can be formed without an intervening adhesive. For example, dielectric bonding surfaces of the dielectric field regions of the respective semiconductor elements 2a, 2b can be polished to a high degree of smoothness. The bonding surfaces can be cleaned and exposed to a plasma and/or suitable chemistries (e.g., etchants) to activate the surfaces. In some embodiments, the surfaces can be terminated with a species after activation or during activation (e.g., during the plasma and/or chemical processes). In various embodiments, the terminating species can comprise nitrogen. Further, in some embodiments, the bonding surfaces can be exposed to fluorine. For example, there may be one or multiple fluorine peaks near layer and/or bonding interfaces 8. Thus, in the directly bonded structures, the bonding interface 8 between two dielectric materials can comprise a very smooth interface with higher nitrogen content and/or fluorine peaks at the bonding interface 8.

In some embodiments, a portion of the security structure or circuit 20 may be shared between the first semiconductor element 2a and the second semiconductor element 2b. For example, a hybrid bonding technique can be used to provide conductor-to-conductor direct bonds along a bond interface 8 that includes covalently direct bonded dielectric-to-dielectric surfaces. In various embodiments, the conductor-to-conductor (e.g., contact pad to contact pad) direct bonds and the dielectric-to-dielectric bonds can be formed using the direct bonding techniques disclosed at least in U.S. Pat. Nos. 9,716,033 and 9,852,988, the entire contents of each of which are incorporated by reference herein in their entirety and for all purposes.

For example, as explained above, dielectric bonding surfaces can be prepared and directly bonded to one another without an intervening adhesive. Conductive contact pads (which may be surrounded by nonconductive dielectric field regions) may also directly bond to one another without an intervening adhesive. For example, in some embodiments, the respective contact pads can be recessed below the dielectric field regions, for example, recessed in a range of 2 nm to 20 nm, or in a range of 4 nm to 10 nm. The dielectric field regions can be directly bonded to one another without an adhesive at room temperature in some embodiments and, subsequently, the bonded structure 1 can be annealed. Upon annealing, the contact pads can expand and contact one another to form a metal-to-metal direct bond along the bonding interface 8.

Various embodiments disclosed herein relate to a first semiconductor element 2a having a first front side 17a and a first back side 18a opposite the first front side 17a. A second semiconductor element 2b can have a second front side 17b and a second back side 18b opposite the second front side 17b. The first front side 17a of the first semiconductor element 2a can be directly bonded to the second front side 17b of the second semiconductor element 2b along a bond interface 8 without an adhesive. Security circuitry 20 can extend across the bond interface 8 using directly bonded metal contacts at the interface between the two elements. The security circuitry can be electrically connected to and can form part of one or both the first and second semiconductor elements. The security circuitry 20 described herein can be used with or without the use of a separate protective element with obstructive material, such as the protective elements and obstructive materials described throughout U.S. patent application Ser. No. 16/844,932, filed Apr. 9, 2020; U.S. patent application Ser. No. 16/844,941, filed Apr. 9, 2020; and U.S. patent application Ser. No. 16/846,177, filed Apr. 10, 2020, the entire contents of each of which are hereby incorporated by reference in their entirety and for all purposes.

Security blocks in a system-on-chip (SoC) encrypt and decrypt data that is sent to and received by the user. The security blocks also validate and/or authenticate the software or boot-code provided by the manufacturer or system administrator. Third parties can utilized sophisticated fault injection techniques to try to induce the transistor or circuit into sending a validate/OK signal instead of the real authentication result. Expensive techniques can be employed to inject faults that appear like a positive validation of the security authentication/encryption. Current implementations may have either the frontside of the backside of the chip available for different fault injection approaches.

Figure 1A:
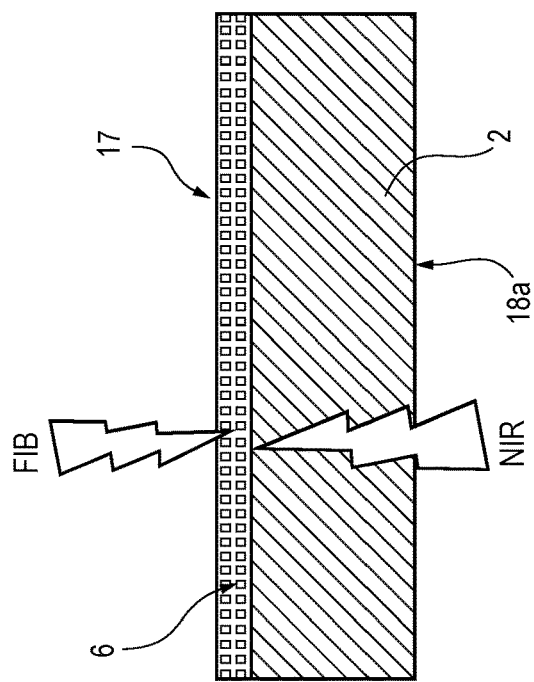
FIG. 1A is a schematic side sectional view of a semiconductor element having active circuitry that may be sensitive or confidential.

FIG. 1A is a schematic side sectional view of a semiconductor element 2 (e.g., an integrated device die or chip) having active circuitry 6 that may be sensitive or confidential. FIG. 1B is a schematic side sectional view of a bonded structure 1 in which a second semiconductor element 2b (e.g., an integrated device die or chip) having active circuitry 6b is stacked on a first semiconductor element 2a (e.g., an integrated device die or chip) having active circuitry 6a. The first and second semiconductor elements 2a, 2b can be bonded and/or electrically connected to one another. For example, in various arrangements, the semiconductor elements 2a, 2b can be directly bonded to one another without an adhesive.

As shown in FIGS. 1A, focused ion beam (FIB) techniques may be used to access active circuitry 6 at a front side 17 of a semiconductor element 2 (e.g., an active integrated device die or chip). FIB fault injection techniques can enable an attacker to arbitrarily modify the structure of a circuit, reconstruct missing buses, cut existing wires, mill through layers and rebuild them, etc. FIB fault injection techniques on the front side 17 of the semiconductor element 2 can enable the attacker to reconstruct sensitive circuitry, compromising the confidentiality and security of the sensitive circuitry. Furthermore, optical techniques (e.g., near infrared, or NIR, lasers, or focused ion beams, FIB) may be used to access active circuitry 6 from a back side 18 of the semiconductor element 2. The back side optical intrusion techniques can be used to trigger circuitry (e.g., flip memory bits or switch transistors), or to physically modify circuits by cutting lines, milling through layers to be rebuilt, etc., also enabling the attacker to reconstruct sensitive circuits so as to compromise confidentiality and/or security of the sensitive circuitry 6.

Turning to FIG. 1B, as explained above, two semiconductor elements 2a, 2b can be directly bonded to one another along a bonding interface 8 without an adhesive. For example, conductive contacts of the first semiconductor element 2a can be directly bonded to corresponding conductive contacts of the second semiconductor element 2b. Nonconductive field region of the first semiconductor element 2a can be directly bonded to corresponding nonconductive field regions of the second semiconductor element 2b. In FIG. 1B, both semiconductor elements 2a, 2b may comprise active integrated device dies with respective active circuitry 6a, 6b. In some embodiments, as explained above an additional protective element with obstructive material can also be provided to protect the semiconductor elements 2a, 2b and active circuitry 6a, 6b. The semiconductor elements 2a, 2b may be bonded in a face-to-face (F2F) configuration, in which the respective front sides 17a, 17b of the first and second semiconductor elements 2a, 2b can be directly bonded to one another. Such F2F direct bond configurations may obviate the use of FIB to access the sensitive circuitry 6a, 6b directly. To access the sensitive circuitry 6a, 6b, a third party may attempt to use simultaneously aligned NIR beams from both the front and back sides of the bonded structure 1, e.g., through the respective back sides 18a, 18b of the semiconductor elements 2a, 2b. However, providing adequate alignment may be challenging. Thus, in various embodiments, a bonded F2F structure can prevent external access or make it more challenging when subject to FIB or NIR intrusion techniques.

As explained above, current security architecture may be susceptible to NIR laser attacks, in which the back side 18 of a substrate (e.g., a back side 18 of a semiconductor element 2) can be irradiated with a NIR beam. The third party attacker may attack circuits at the back or bottom layers of the semiconductor element. FIB intrusions or attacks may utilize the front side 17 of the semiconductor element to align the beam to routes in the die. Backside FIB may be more difficult to circumvent the circuitry.

The security architecture can include various types of security or encryption blocks. For example, the security architecture can comprise a Data Encryption Standard (DES) block, which is a symmetric-key algorithm for the encryption of electronic data. Although now considered insecure (and therefore 3-DES is used), DES was highly influential in the advancement of modern cryptography. Thus, in some embodiments, in cryptography, Triple DES (3-DES) can be used. 3-DES is a symmetric-key block cipher, which applies the Data Encryption Standard (DES) cipher algorithm three times to each data block.

The security or encryption blocks can additionally or alternatively include an Advanced Encryption Standard (AES) block, which is a symmetric (same key for encryption and decryption) block cipher chosen by the U.S. government to protect classified information and which is implemented in software and hardware throughout the world to encrypt sensitive data. AES is more secure than its predecessors (e.g., DES and 3DES), since the algorithm is stronger and uses longer key lengths. AES also enables faster encryption than DES and 3DES, making it beneficial for software applications, firmware and hardware that utilize either low latency or high throughput, such as firewalls and routers. AES is used in many protocols, such as Secure Sockets Layer (SSL)/Transport Layer Security (TLS) and can be found in most modern applications and devices that need encryption functionality.

The security or encryption blocks can additionally or alternatively include a SNOW-3G block, which is a stream cipher used by the 3GPP standards as the core part of the confidentiality and integrity algorithms for Universal Mobile Telecommunications Service (UMTS) and Long Term Evolution (LTE) networks. SNOW-3G can be used to encrypt air data/voicecalls.

The security or encryption blocks can additionally or alternatively include an RSA block, which is one of the first public-key cryptosystems (asymmetric key) and is widely used for secure data transmission. In such a cryptosystem, the encryption key is public and it is different from the decryption key which is kept secret. In various embodiments, the security or encryption blocks can include a hash encryption block. Whereas encryption is a two-step process used to first encrypt and then decrypt a message, hashing condenses a message into an irreversible fixed-length value, or hash. Two of the most common hashing algorithms used in networking are MD5 and SHA-1. Hashing can be used for authentication.

FIG. 2A is a schematic side sectional view of an integrated device package 82 that includes a bonded structure 1 according to various embodiments. Unless otherwise noted, components of FIG. 2A may be the same as or generally similar to like-numbered components of FIGS. 1A-1B. In FIG. 2A, the first semiconductor element 2a can be mounted to a carrier 5. The carrier 5 can comprise any suitable type of carrier that can support the bonded structure 1. For example, the carrier 5 can comprise a package substrate, such as a printed circuit board (PCB), leadframe, ceramic substrate, etc. In various embodiments, the carrier 5 can comprise an interposer, a reconstituted wafer or element, an integrated device die or chip, etc. The carrier 5 can include interconnects 7, such as solder balls or other conductors, to connect to an external device (e.g., a motherboard). The first semiconductor element 2a can be mounted to the carrier 5 in any suitable manner. In some embodiments, the first semiconductor element 2a can be bonded to the carrier 5 with an adhesive. In other embodiments, the first semiconductor element 2a can be directly bonded to the carrier 5 without an adhesive. As shown, in some embodiments, the first semiconductor element 2a can be electrically connected to the carrier 5 by way of bonding wires 9. In other embodiments, the first semiconductor element 2a can be flip chip mounted to the carrier 5 by way of solder balls, or can be direct hybrid bonded without an adhesive.

As shown, the semiconductor element 2b can be stacked on and directly bonded to the first semiconductor element 2a along the bonding interface 8 without an adhesive. For example, nonconductive field regions 19a of the first semiconductor element 2a can be directly bonded to nonconductive field regions 19b of the second semiconductor element 2b without an adhesive. Further, contact pads 21a of the first semiconductor element 2a can be directly bonded to corresponding contact pads 21b of the second semiconductor element 2b without an adhesive. In the illustrated embodiment, a molding compound 11 can be provided over the first and second semiconductor elements 2a, 2b and the carrier 5. In other embodiments, no molding compound may be provided.

As explained herein, security circuitry 20 can extend across the bond interface 8. The security circuitry 20 can be electrically connected to the first and second semiconductor elements 2a, 2b. For example, the respective contact pads 21a, 21b can electrically connect to corresponding portions of the security circuitry 20 on the semiconductor elements 2a, 2b and can provide the electrical connection across the bond interface 8. As explained herein with respect to FIGS. 2B-2C, the security circuitry 20 can be configured to prevent external access to sensitive data or circuitry in the semiconductor elements 2a and/or 2b.

Figure 2B:
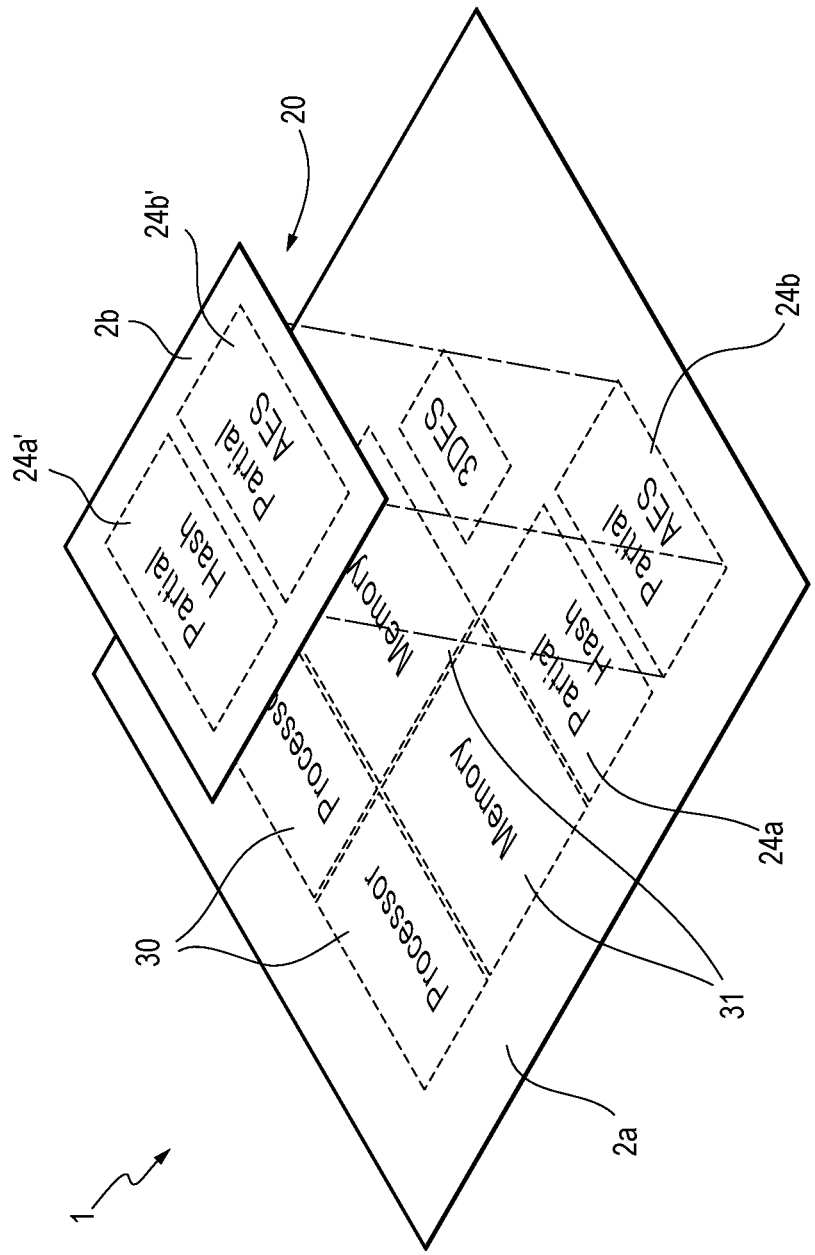
FIG. 2B is a three-dimensional schematic system diagram of security circuitry and other components on the first and second semiconductor elements of the bonded structure FIG. 2A.

Turning to FIG. 2B, in various embodiments, a bonded structure 1 can comprise security circuitry 20 that includes one or multiple first security circuit blocks 24a, 24b on the first semiconductor element 2a and one or more second security circuit blocks 24a', 24b' on the second semiconductor element 2b. FIG. 2B is a three-dimensional schematic system diagram of security circuitry 20 and other components on the first and second semiconductor elements 2a, 2b. The schematic system diagram represents a schematic exploded view of the bonded structure 1 in order to visualize the bonded circuits. The active circuitry (e.g., including processor circuitry 30, memory circuitry 31, and security circuitry 20) shown in the first and second semiconductor elements 2a, 2b can be provided at or near respective front sides of the first and second semiconductor elements 2a, 2b. Active circuitry may also be present at other portions of the semiconductor elements 2a, 2b.

As shown in FIG. 2B, the first and second semiconductor elements 2a, 2b can be directly bonded to one another without an adhesive. The first and second semiconductor elements 2a, 2b can have respective first and second conductive contact pads 21a, 21b directly bonded to one another without an adhesive to electrically connect the first and second security circuit blocks 24a, 24b and 24a', 24b' and to form the security circuitry 20. As shown, other components can also be directly bonded and electrically connected. For example, one or more processors 30 and memory devices 31 can be provided on the first semiconductor element 2a, The processors 30 and memory devices 31 can electrically communicate with the first security block 24a, which can encrypt or otherwise provide electronic security for data transmitted and/or received by the processors 30 and memory devices 41.

In the illustrated embodiment, the first security block 24a on the first semiconductor element 2a can comprise a partial hash security block that includes circuitry for only a portion of the hash security structure. The first security block 24b on the first semiconductor element 2a can comprise a partial Advanced Encryption Standard (AES) security block that includes circuitry for only a portion of the AES security structure.

Similarly, the second security block 24a' on the second semiconductor element 2b can comprise a partial hash security block that includes circuitry for only a portion of the hash security structure. In particular, the second security block 24a' includes circuitry that is complementary to the partial hash security block of the first security block 24a such that the first and second security blocks 24a, 24a' together form a complete hash security structure. Further, the second security block 24b' on the second semiconductor element 2b can comprise a partial AES security block that includes circuitry for only a portion of the AES security structure. In particular, the second security block 24b' includes circuitry that is complementary to the partial AES security block of the first security block 24b such that the first and second security blocks 24b, 24b' together form a complete AES security structure. It should be appreciated that, although hash and AES security structures are illustrated and described in FIG. 2B, any suitable type of security or encryption structures can be used. Thus, in FIG. 4B, the security circuitry 20 can span the direct bond interface 8 such that, if the circuitry on one die were read or otherwise tampered with, the overall circuit would not provide an independent fault injection pathway to provide external access to the sensitive circuitry.

Accordingly, in various embodiments, neither the first nor second semiconductor elements 2a, 2b provide an independent fault injection pathway sufficient to provide false authentication. For example, a first output signal of the first security circuit block 24a or 24b in response to a fault injection can be independent of a second output signal of the second security circuit block 24a' or 24b' in response to the fault injection. Thus, a fault injection into the first security circuit block 24a and/or 24b does not trigger an authentication signal that would provide access in the second security circuit block 24a and/or 24b, and vice versa.

In various embodiments, the security circuitry 20 on both the first and second semiconductor elements 2a, 2b may be needed to access secure information. In some embodiments, the security circuitry 20 can span the bond interface 8 by providing duplicate circuitry on the first and second semiconductor elements 2a, 2b. The duplicated circuitry can be used such that a response to a stimulus needs to match, or else an alert will be sent to other circuitry indicating that an attack has occurred. For example, monitoring circuitry can be configured to compare first and second outputs from first and second security blocks in response to first and second input signals (which may comprise a same input signal) and, based on the comparison, trigger an alert signal if the first and second respective outputs are non-matching. For example, the first and second outputs may be determined to be non-matching if respective values of the first and second outputs are different (e.g., the values differ by an amount greater than a threshold). As another example, the first and second outputs may be non-matching if first and second outputs that are expected to be complementary are determined to be non-complementary.

In various embodiments, a detection circuit 35 can be provided in at least one of the first and second semiconductor elements 2a and/or 2b (for example, in the first semiconductor element 2a as shown in FIG. 2B). The detection circuit 35 can be configured to determine whether a fault injection has occurred in the security circuitry 20. A response circuit 36 can be provided to, in response to an alert signal from the detection circuit 35, deny electronic access to the first and second semiconductor elements 2a, 2b. In some embodiments, a daisy chain of detection circuitry can be provided to detect reverse engineering attempts by third parties. In some embodiments, a mesh connection can be used to detect reverse engineering attempts. For example, clock delivery, power delivery, or ground delivery can be connected with the other die. If the supplies are severed, there are too many connections to try to reconnect with direct writing of a FIB.

Figure 2C:
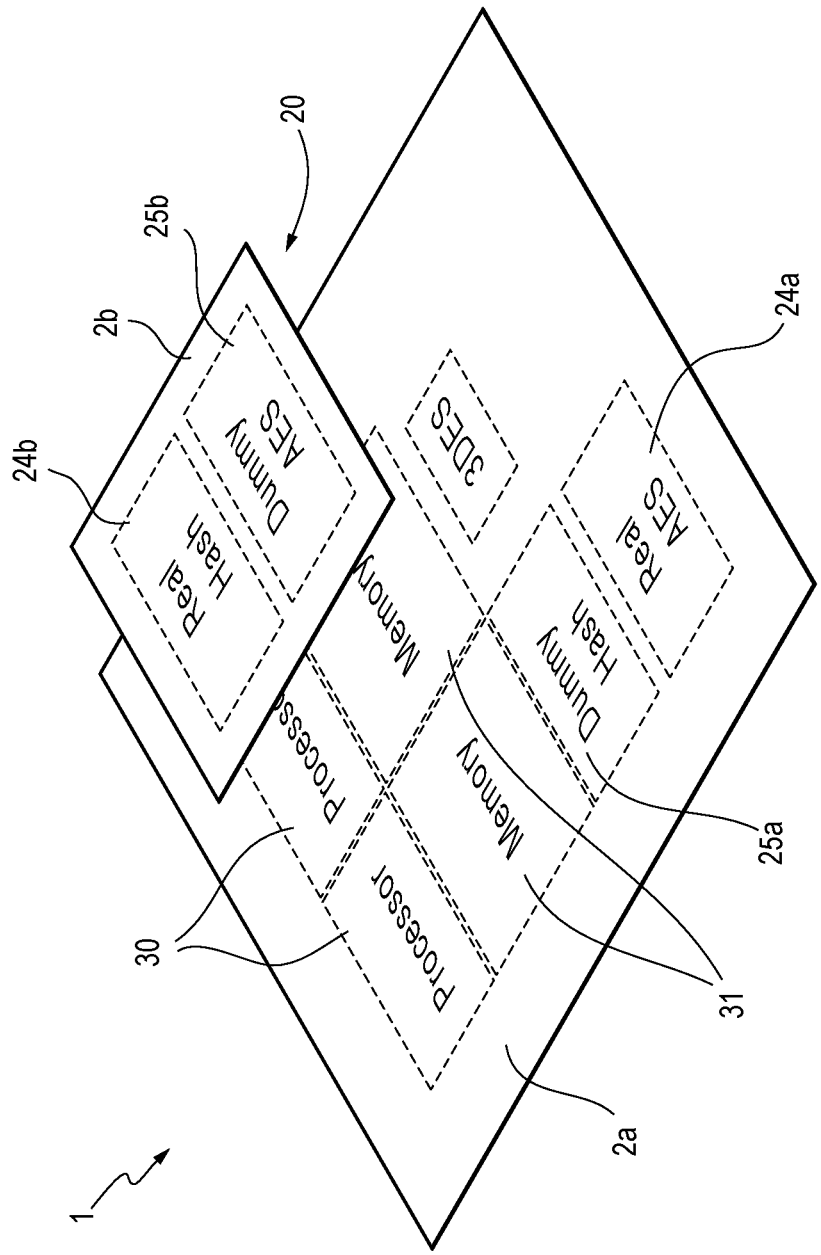
FIG. 2C is a three-dimensional schematic system diagram of security circuitry that includes one or more dummy security blocks on the first and/or second semiconductor elements of the bonded structure of FIG. 2A.

FIG. 2C is a three-dimensional schematic system diagram of security circuitry 20 that includes one or more dummy security blocks 25a, 25b on the first and/or second semiconductor elements 2a, 2b of the bonded structure 1 of FIG. 2A. In some embodiments, a first dummy security circuit block 25a can be provided in the first semiconductor element 2a. The first dummy security circuit 25a can comprise active circuitry representative of security circuitry but that does not encrypt or decrypt data. In various embodiments, for example, the dummy security block 25a can comprise randomly and actively switching circuitry that can confuse a third party attacker into believing that the dummy security block 25a is a secure active circuit. In some embodiments, the dummy security block 25a can comprise non-functional circuitry. In some embodiments, a second dummy security 25b circuit block can be provided in the second semiconductor element 2b. In various arrangements, the dummy security block(s) 25a, 25b can be provided entirely within one of the first and second semiconductor elements 2a, 2b, or in both the first and second semiconductor elements 2a, 2b. In various embodiments, a plurality of dummy security circuits blocks 25a, 25b can be provided in at least one of the first and second semiconductor elements 2a, 2b.

In addition to the dummy security circuits 25a, 25b, authentic security circuitry, such as authentic security blocks 25a, 25b can be provided in at least one of the first and second semiconductor elements 2a, 2b. For example, as shown in FIG. 2C, a first security block 24a, such as an authentic or real AES circuit block, can be provided on the first semiconductor element 2a. A second security block 24b, such as an authentic or real hash security block, can be provided on the second semiconductor element 2b. In some embodiments, the active and dummy circuitry 24a, 24b, 25a, 25b can be interspersed with one another. Unlike the dummy security blocks 25a, 25b, the security circuitry or security blocks 24a, 24b can be configured to encrypt or decrypt data. In various embodiments, as explained above, the security circuitry 20 extends across the bond interface. In the illustrated embodiment, the second dummy security block 25b can comprise fake or inauthentic AES circuitry, and can be disposed opposite to the first security block 24a of authentic AES circuitry. In some embodiments, the second dummy security block 25b can electrically connect to the first security block 24a across the bond interface 8. Further, the first dummy security block 25a can comprise fake or inauthentic hash circuitry, and can be disposed opposite to the second security block 24b of authentic hash circuitry. In some embodiments, the first dummy security block 25a can electrically connect to the second security block 24b across the bond interface 8. In other embodiments, the dummy security blocks 25 can be disposed opposite one another on opposing semiconductor elements 2a, 2b, and can be electrically connected to one another across the bond interface 8. It should be appreciated that in other embodiments, the blocks 25, 25b can include the authentic security circuitry, and the blocks 24a, 24b can comprise the dummy or fake circuitry.

Various embodiments can also utilize a chip or chiplet having a protective element including, for example, a security or obstructive material that protects a circuit to which it is bonded. One or more protective elements can be directly bonded without an adhesive to one or both of the first and second semiconductor elements over sensitive active circuitry. The protective element with obstructive material can prevent external access to the sensitive active circuitry. Obstructive materials can include, for example, an abrasive and/or destructive material adjacent to a bond interface. In various embodiments, direct bonding of separately fabricated protective chips or chiplets facilitates using separate processing that cannot be directly applied to a fabricated integrated circuit or otherwise sensitive microelectronic element, due to thermal budget or chemical compatibility constraints. For example, the obstructive materials can be formed on a separate protective element at a higher temperature than the direct bonding temperatures. The direct bonding process itself consumes relatively little thermal budget, including both room temperature initial covalent bonding between dielectric bonding layers, and possible annealing to strengthen the bonds and/or facilitate metal bonding in a hybrid bonding process.

If a third party attempts to remove the abrasive and/or destructive material, the removal tools can be damaged (by abrasive obstructive materials) and/or the underlying active circuitry is damaged by the removal attempt. The obstructive material can thus be "destructive" to either the removal tools or the protected circuit. Either result can prevent reverse engineering, hacking, inspection, or other breach of the secured area, circuitry or devices.

In some implementations, the obstructive material can comprise an abrasive and/or destructive layer on a chiplet. Additionally or alternatively, the chiplet itself may comprise an abrasive and/or destructive material, and/or a hard material. Multiple abrasive and/or destructive materials may be combined in multiple layers or patterns within a layer to enhance the destructive effect. In various embodiments, the obstructive material can alternatively or additionally comprise a light blocking material configured to block light or electromagnetic waves. The obstructive material can alternatively or additionally be selected or shaped to scatter incident light. The obstructive material can alternatively or additionally be electrically conductive.

Additional details of protective elements with obstructive materials may be found throughout U.S. patent application Ser. No. 16/844,932, filed Apr. 9, 2020; U.S. patent application Ser. No. 16/844,941, filed Apr. 9, 2020; and U.S. patent application Ser. No. 16/846,177, filed Apr. 10, 2020, the entire contents of each of which are hereby incorporated by reference in their entirety and for all purposes. The embodiments disclosed herein can be used in combination with any of the embodiments disclosed in U.S. patent application Ser. Nos. 16/844,932; 16/844,941; and 16/846,177.

FIG. 3 is a schematic diagram of an electronic system 80 incorporating one or more bonded structures 1, according to various embodiments. The system 80 can comprise any suitable type of electronic device, such as a mobile electronic device (e.g., a smartphone, a tablet computing device, a laptop computer, etc.), a desktop computer, an automobile or components thereof, a stereo system, a medical device, a camera, or any other suitable type of system. In some embodiments, the electronic system 80 can comprise a microprocessor, a graphics processor, an electronic recording device, or digital memory. The system 80 can include one or more device packages 82 which are mechanically and electrically connected to the system 80, e.g., by way of one or more motherboards. Each package 82 can comprise one or more bonded structures 1. The system 80 shown in FIG. 3 can comprise any of the bonded structures 1 shown and described herein.

In one embodiment, a bonded structure is disclosed. The bonded structure can include a first semiconductor element having a first front side and a first back side opposite the first front side. The bonded structure can include a second semiconductor element having a second front side and a second back side opposite the second front side, the first front side of the first semiconductor element directly bonded to the second front side of the second semiconductor element along a bond interface without an adhesive. The bonded structure can include security circuitry extending across the bond interface, the security circuitry electrically connected to the first and second semiconductor elements.

In some embodiments, the security circuitry comprises a first security circuit block on the first semiconductor element and a second security circuit block on the second semiconductor element, the first and second semiconductor elements having respective first and second conductive contact pads directly bonded to one another without an adhesive to electrically connect the first and second security circuit blocks. In some embodiments, neither the first nor second semiconductor elements provide an independent fault injection pathway sufficient to provide false authentication. A first output signal of the first security circuit block in response to a fault injection can be independent of a second output signal of the second security circuit block in response to the fault injection. A fault injection into the first security circuit block may not trigger an authentication signal necessary for access in the second security circuit block, and vice versa. The first and second security blocks can comprise duplicate circuitry.

In some embodiments, the bonded structure can include a detection circuit in at least one of the first and second semiconductor elements, the detection circuit configured to determine whether a fault injection has occurred in the security circuitry. The bonded structure can include a response circuit configured to, in response to an alert signal from the detection circuit, deny electronic access to the first and second semiconductor elements.

In some embodiments, the bonded structure can include first active circuitry at or near the first front side of the first semiconductor element and second active circuitry at or near the second front side of the second semiconductor element. The bonded structure can include a protective element bonded to the first back side of the first semiconductor element, the protective element including an obstructive material covering active circuitry of the first semiconductor element, the obstructive material configured to obstruct external access to the active circuitry. The protective element can be directly bonded to the first back side without an adhesive. A first hardness of the obstructive material can be greater than a second hardness of the semiconductor element. The first hardness can be at least 1.2 times the second hardness. The obstructive material can comprise an abrasive material. Alternatively or additionally, the obstructive material can comprise a light-blocking material. The light-blocking material can be configured to block light at wavelengths in a range of 700 nm to 1 mm. The light-blocking material can be configured to block light at wavelengths in a range of 800 nm to 2,500 nm. The light-blocking material can be configured to block light at near infrared (NIR) wavelengths. In some embodiments, the obstructive material can be configured to prevent physical access to the active circuitry. The obstructive material can be configured to physically destroy hardware use for controlled removal of semiconductor material from the bonded structure. The obstructive material can comprise an electromagnetic shield configured to block near infrared (NIR) and focused ion beam (FIB) fault injection attempts.

In some embodiments, the bonded structure can include a first bonding layer on the first front side and a second bonding layer on the second front side. The first and second bonding layers can comprise silicon oxide.

In another embodiment, a bonded structure is disclosed. The bonded structure can include a first semiconductor element having a first front side and a first back side opposite the first front side. The bonded structure can include a second semiconductor element having a second front side and a second back side opposite the second front side, the first front side of the first semiconductor element bonded to the second front side of the second semiconductor element along a bond interface, the second semiconductor element comprising an active security circuit block. The bonded structure can include a first dummy security circuit block in at least the first semiconductor element.

In some embodiments, the first front side of the first semiconductor element can be directly bonded to the second front side of the second semiconductor element without an adhesive. The first dummy security circuit can comprise active circuitry representative of security circuitry but that does not encrypt or decrypt data. The first dummy security circuit can be configured to switch randomly. The first dummy security circuit can be non-functional. The bonded structure can include a second dummy security circuit block in the second semiconductor element. The bonded structure can include a plurality of dummy security circuits blocks in at least one of the first and second semiconductor elements. The bonded structure can include active security circuitry in the first semiconductor element, the active security circuitry configured to encrypt or decrypt data. The active security circuitry can extend across the bond interface. The bonded structure can include a detection circuit in at least one of the first and second semiconductor elements, the detection circuit configured to determine whether a fault injection has occurred in the security circuitry. The bonded structure can include a response circuit configured to, in response to an alert signal from the detection circuit, deny electronic access to the first and second semiconductor elements. The bonded structure can include a protective element bonded to the first back side of the first semiconductor element, the protective element including an obstructive material disposed over active circuitry, the obstructive material configured to obstruct external access to the active circuitry. The protective element can be directly bonded to the first back side without an adhesive.

In another embodiment a method of forming a bonded structure is disclosed. The method can include forming a first security circuit block in a first semiconductor element. The method can include forming a second security circuit block in a second semiconductor element. The method can include directly bonding the first semiconductor element to the second semiconductor element without an adhesive such that the first and second security circuit blocks are electrically connected.

In some embodiments, the method can include directly bonding first conductive contact pads in electrical communication with the first security circuit block to second conductive contact pads in electrical communication with the second security block without an adhesive. The method can include forming a first dummy security circuit, the first dummy security circuit comprising active circuitry representative of security circuitry but that does not encrypt or decrypt data. The method can include forming a second dummy security circuit, the second dummy security circuit comprising active circuitry representative of security circuitry but that does not encrypt or decrypt data. The method can include forming a detection circuit in at least one of the first and second semiconductor elements, the detection circuit configured to determine whether a fault injection has been occurred in the security circuitry. The method can include forming a response circuit configured to, in response to an alert signal from the detection circuit, deny electronic access to the first and second semiconductor elements. The method can include directly bonding a protective element to the first semiconductor element without an adhesive, the protective element including an obstructive material disposed over active circuitry, the obstructive material configured to obstruct external access to the active circuitry.

Although disclosed in the context of certain embodiments and examples, it will be understood by those skilled in the art that the present invention extends beyond the specifically disclosed embodiments to other alternative embodiments and/or uses and obvious modifications and equivalents thereof. Further, unless otherwise noted, the components of an illustration may be the same as or generally similar to like-numbered components of one or more different illustrations. In addition, while several variations have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the present disclosure. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by a fair reading of the aspects that follow.

What is claimed is:

1. A bonded structure comprising:
    a semiconductor element with first circuitry;
    a protective element directly bonded to the semiconductor element along a bond interface without an adhesive, the protective element comprising an obstructive material disposed over the first circuitry; and
    a detection circuit capable of detecting external access to the protective element.

2. The bonded structure of claim 1, wherein the semiconductor element has a first front side and a first back side opposite the first front side.

3. The bonded structure of claim 2, further comprising a second semiconductor element having a second front side and a second back side opposite the second front side, the first front side of the semiconductor element directly bonded to the second front side of the second semiconductor element along a second bond interface without an adhesive.

4. The bonded structure of claim 3, further comprising security circuitry extending across the second bond interface, the security circuitry electrically connecting the first and second semiconductor elements, wherein the security circuitry comprises a first security circuit block on the first semiconductor element and a second security circuit block on the second semiconductor element, the first and second semiconductor elements having respective first and second conductive contact pads directly bonded to one another without an adhesive to electrically connect the first and second security circuit blocks.

5. The bonded structure of claim 4, wherein the first security block contains first active circuitry and second security block comprise second active circuitry, wherein the first and second active circuitry are designed to generate matching outputs with matching inputs, the first and second security blocks electrically connected to monitoring circuitry, the monitoring circuitry configured to compare first and second outputs from the first and second security blocks in response to respective first and second input signals, and, based on the comparison, to trigger an alert signal if the first and second outputs are determined to be different or non-complementary.

6. The bonded structure of claim 4, wherein the first and second security blocks each comprise duplicate circuitry configured electrically connected to monitoring circuitry, the monitoring circuitry configured to compare first and second outputs from the first and second security blocks in response to respective first and second input signals, and, based on the comparison, to trigger an alert signal if the first and second outputs are determined to be different or non-complementary.

7. The bonded structure of claim 4, wherein the detection circuit is configured to determine whether a fault injection occurred in the security circuitry.

8. The bonded structure of claim 7, further comprising a response circuit configured to, in response to an alert signal from the detection circuit, deny electronic access to the first and second semiconductor elements.

9. The bonded structure of claim 4, further comprising a daisy chain of detection circuitry, wherein the daisy chain can detect reverse engineering attempts on either the first or second semiconductor element.

10. The bonded structure of claim 4, further comprising a mesh connection between the first and second semiconductor elements, wherein the mesh connection can detect reverse engineering attempts on either the first or second semiconductor element.

11. The bonded structure of claim 10, wherein the mesh connection comprises a clock delivery, power delivery, or ground delivery connection.

12. The bonded structure of claim 11, wherein severing the mesh connection prevents reconnection with direct wiring of a focused ion beam.

13. The bonded structure of claim 3, wherein nonconductive field regions of the semiconductor element are directly bonded to corresponding nonconductive field regions of the second semiconductor element and contact pads of the semiconductor element are directly bonded to corresponding contact pads of the second semiconductor element.

14. The bonded structure of claim 1, wherein the detection circuit is further configured to detect external access to the semiconductor element.

15. A method of forming a bonded structure, the method comprising:
   forming a semiconductor element with first circuitry;
   directly bonding a protective element to the semiconductor element along a bond interface without an adhesive, the protective element comprising an obstructive material disposed over the first circuitry; and
   forming a detection circuit capable of detecting external access to the protective element.

16. The method of claim 15, further comprising directly bonding a second semiconductor element to the first semiconductor element across a second bond interface, wherein security circuitry extends across the second bond interface.

17. The method of claim 16, further comprising directly bonding a first conductive contact pad in electrical communication with a first security circuit block of the semiconductor element to a second conductive contact pad in electrical communication with a second security block of the second semiconductor element without an adhesive.

18. The method of claim 16, wherein the detection circuit is configured to determine whether a fault injection has occurred in the security circuitry.

19. The method of claim 16, further comprising forming a response circuit configured to, in response to an alert signal from the detection circuit, deny electronic access to the first and second semiconductor elements.

20. The method of claim 16, further comprising forming a daisy chain of detection circuitry, wherein the daisy chain can detect reverse engineering attempts on either the first or second semiconductor element.

21. The method of claim 16, further comprising forming a mesh connection between the first and second semiconductor elements, wherein the mesh connection can detect reverse engineering attempts on either the first or second semiconductor element.

22. The method of claim 21, wherein forming the mesh connection comprises a clock delivery, power delivery, or ground delivery connection.

23. The method of claim 22, wherein severing the mesh connection prevents reconnection with direct wiring of a focused ion beam.

24. The method of claim 17, further comprising directly bonding nonconductive field regions of the semiconductor element to nonconductive field regions of the second semiconductor element.

* * * * *